United States Patent
Tsujikawa et al.

(10) Patent No.: US 10,297,257 B2
(45) Date of Patent: May 21, 2019

(54) VOICE INFORMATION CONTROL METHOD AND TERMINAL DEVICE

(71) Applicant: Panasonic Intellectual Property Corporation of America, Torrance, CA (US)

(72) Inventors: Misaki Tsujikawa, Shiga (JP); Isao Shimada, Hyogo (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

(21) Appl. No.: 14/794,847

(22) Filed: Jul. 9, 2015

(65) Prior Publication Data
US 2016/0019894 A1    Jan. 21, 2016

(30) Foreign Application Priority Data
Jul. 16, 2014  (JP) .................. 2014-146096

(51) Int. Cl.
| | |
|---|---|
| G10L 15/08 | (2006.01) |
| G10L 15/26 | (2006.01) |
| G10L 15/30 | (2013.01) |
| G10L 21/0208 | (2013.01) |
| G10L 17/00 | (2013.01) |
| H04M 1/725 | (2006.01) |

(52) U.S. Cl.
CPC ............. *G10L 15/26* (2013.01); *G10L 15/30* (2013.01); *G10L 17/00* (2013.01); *G10L 2021/02087* (2013.01); *H04M 1/72522* (2013.01); *H04M 2250/74* (2013.01)

(58) Field of Classification Search
CPC ......... G10L 15/26; G10L 15/30; G10L 17/00; G10L 2021/02087; H04M 2250/74; H04M 1/72522
See application file for complete search history.

(56) References Cited

U.S. PATENT DOCUMENTS

| | | | | |
|---|---|---|---|---|
| 6,151,571 A | * | 11/2000 | Pertrushin | G10L 17/26 704/207 |
| 6,275,806 B1 | * | 8/2001 | Pertrushin | G10L 17/26 704/270 |
| 6,850,609 B1 | * | 2/2005 | Schrage | H04M 3/42221 379/158 |

(Continued)

FOREIGN PATENT DOCUMENTS

| | | |
|---|---|---|
| JP | 2008-309856 | 12/2008 |
| JP | 2013-011744 A | 1/2013 |
| WO | 2009/075211 A1 | 6/2009 |

*Primary Examiner* — Marcus T Riley
(74) *Attorney, Agent, or Firm* — Greenblum & Bernstein, P.L.C.

(57) ABSTRACT

A voice information control method for a terminal used in a system including a server device which creates text data on the basis of the voice information received from the terminal device, the method including: acquiring plurality items of first voice information; specifying a time interval that includes second voice information which is one of the plurality items of the first voice information, and which includes spoken voice of a first speaker who uses the first terminal device; and transmitting the second voice information included in the specified time interval being transmitted to the server device.

13 Claims, 17 Drawing Sheets

(56) References Cited

U.S. PATENT DOCUMENTS

| | | | | |
|---|---|---|---|---|
| 7,590,538 B2* | 9/2009 | St. John | | H04M 3/382 |
| | | | | 704/246 |
| 7,940,914 B2* | 5/2011 | Petrushin | | G10L 17/26 |
| | | | | 379/265.06 |
| 8,768,705 B2* | 7/2014 | Sundararaman | | H04L 12/1831 |
| | | | | 704/231 |
| 9,014,358 B2* | 4/2015 | Garcia | | H04M 3/42221 |
| | | | | 370/260 |
| 9,015,112 B2* | 4/2015 | Ohmori | | G06F 21/32 |
| | | | | 707/610 |
| 9,666,204 B2* | 5/2017 | Manjunath | | G10L 17/00 |
| 9,875,752 B2* | 1/2018 | Sinder | | G10L 17/00 |
| 9,911,421 B2* | 3/2018 | Tsujikawa | | G10L 17/00 |
| 2002/0002460 A1* | 1/2002 | Pertrushin | | G10L 17/26 |
| | | | | 704/270 |
| 2002/0010587 A1* | 1/2002 | Pertrushin | | G10L 17/26 |
| | | | | 704/275 |
| 2003/0023444 A1* | 1/2003 | St. John | | H04M 3/382 |
| | | | | 704/270.1 |
| 2003/0033145 A1* | 2/2003 | Petrushin | | G10L 17/26 |
| | | | | 704/236 |
| 2006/0200467 A1* | 9/2006 | Ohmori | | G06F 21/32 |
| 2007/0133437 A1* | 6/2007 | Wengrovitz | | H04M 3/56 |
| | | | | 370/260 |
| 2011/0099006 A1* | 4/2011 | Sundararaman | | G10L 15/26 |
| | | | | 704/208 |
| 2011/0178803 A1* | 7/2011 | Petrushin | | G10L 17/26 |
| | | | | 704/270 |
| 2013/0058471 A1* | 3/2013 | Garcia | | H04M 3/42221 |
| | | | | 379/202.01 |
| 2014/0380449 A1* | 12/2014 | Ohmori | | G06F 21/32 |
| | | | | 726/7 |
| 2015/0194155 A1* | 7/2015 | Tsujikawa | | G10L 17/00 |
| | | | | 704/246 |
| 2015/0317977 A1* | 11/2015 | Manjunath | | G10L 17/00 |
| | | | | 704/270 |
| 2017/0256268 A1* | 9/2017 | Sinder | | G10L 17/00 |

* cited by examiner

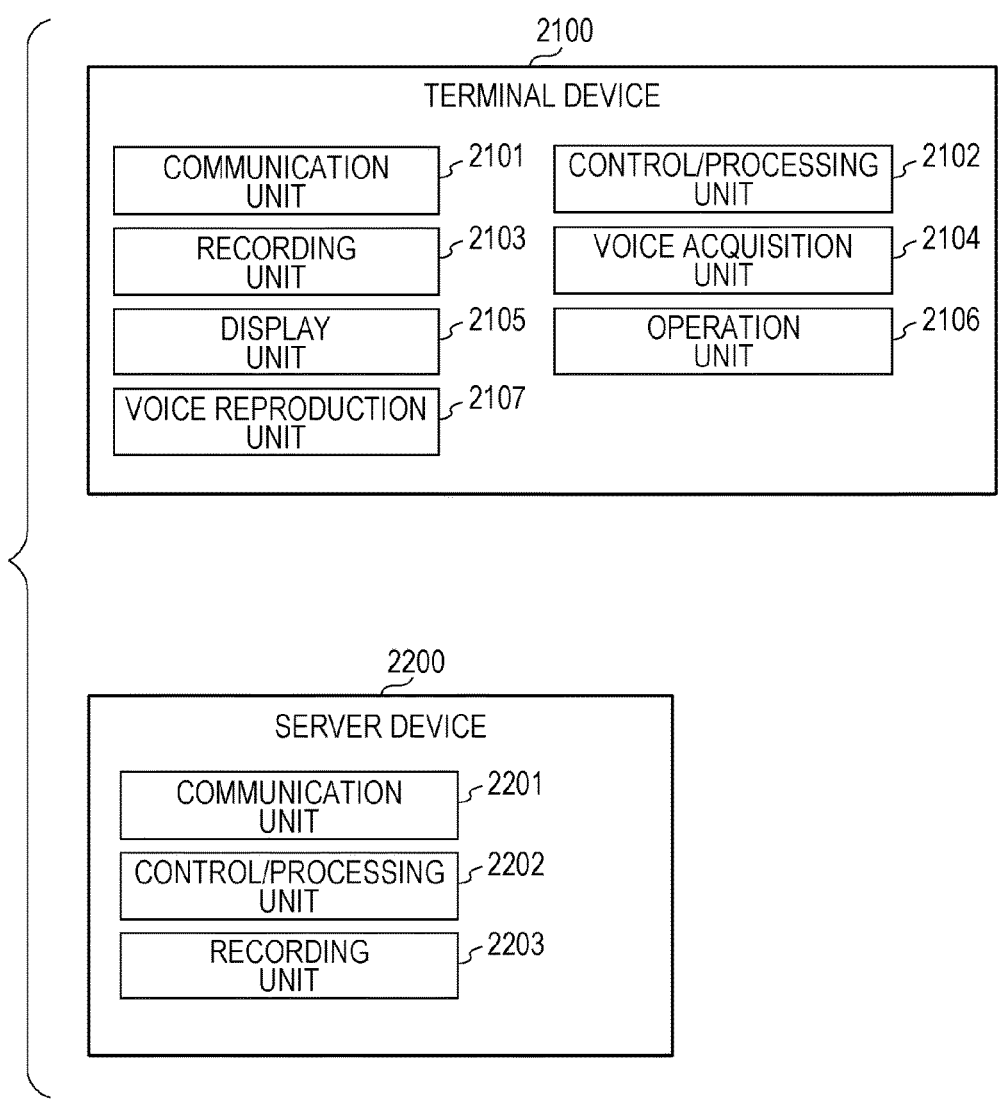

FIG. 9

OKAY   RIGHT, LET'S START THE MEETING

| SENTENCE NUMBER | TIME | SPEAKER | |
|---|---|---|---|
| 1 | 12:00:00 | C | raito, rettu sutāto za mītinngu |
| 2 | 12:00:05 | A | ōkei |
| 3 | 12:00:10 | B | howattu tudeizu azienda? |
| 4 | 12:00:15 | C | za zyoinnto deberoppumento obu a boisu rekogunisyonn sisutemu wizu Panasonic |
| 5 | 12:00:25 | D | rigādinngu za āriā ofu-za-rekōdo komennto |
| ... | ... | ... | ... |

WHAT'S TODAY'S AGENDA?

THE JOINT DEVELOPMENT OF A VOICE RECOGNITION SYSTEM WITH PANASONIC

REGARDING THE EARLIER OFF-THE-RECORD COMMENT

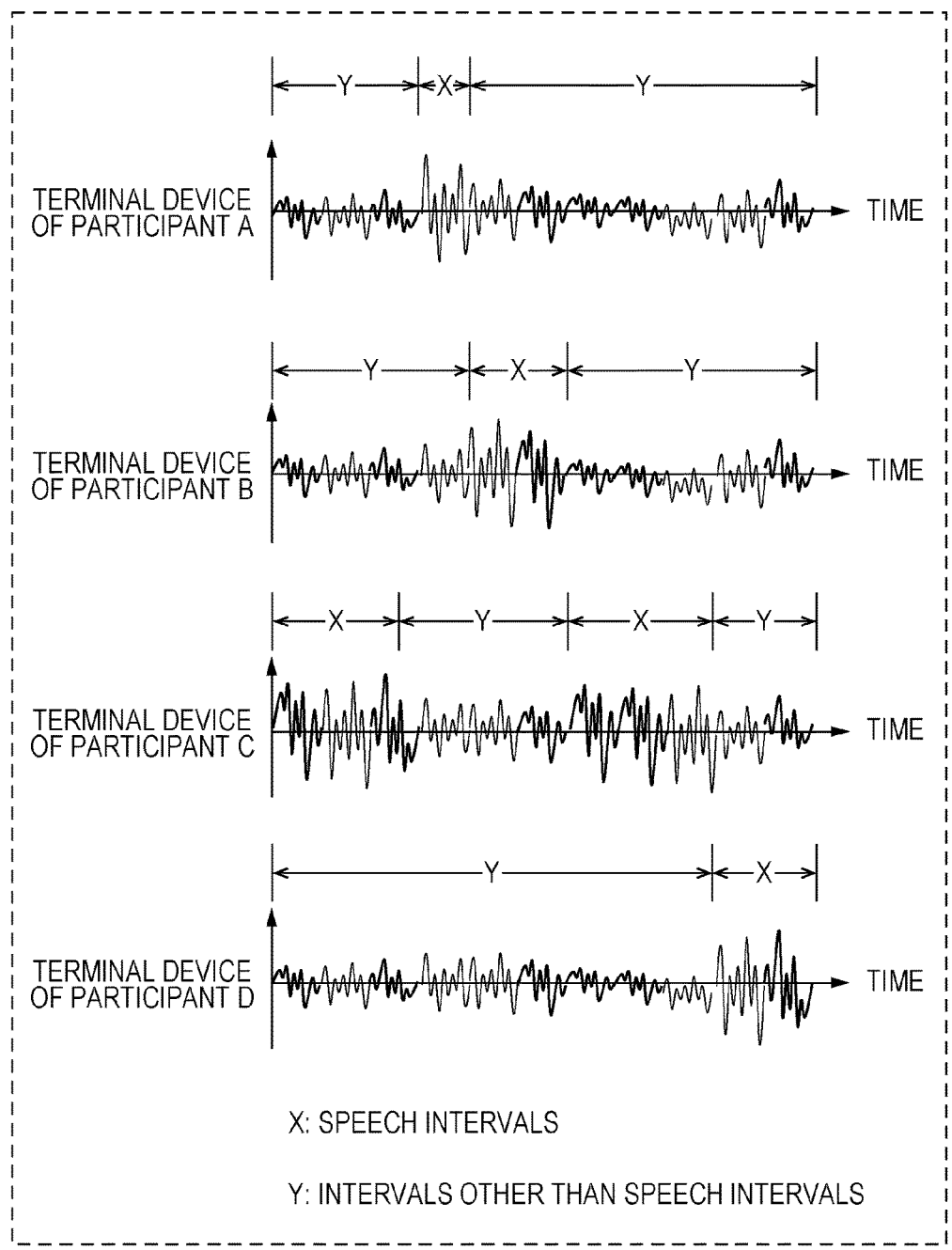

VOICE INFORMATION CONTROL METHOD AND TERMINAL DEVICE

BACKGROUND

1. Technical Field

The present disclosure relates to a voice information control method and a terminal device in a text creation system in which voice is acquired and text is created.

2. Description of the Related Art

Studies have been carried out into text creation systems in which it is possible to acquire voice in a meeting and so forth, convert the acquired voice into text, and record the text as minutes.

SUMMARY

In one general aspect, the techniques disclosed here feature a voice information control method for a terminal device used in a system including server device which creates text data in accordance with the voice information received from the terminal device, the method including: acquiring plurality items of first voice information; specifying a time interval that includes second voice information which is one of the plurality items of the first voice information, and which includes which is spoken voice of a first speaker who uses the terminal device; and transmitting the second voice information included in the specified time interval to the server device.

It should be noted that general or specific embodiments may be implemented as a system, a method, an integrated circuit, a computer program, a storage medium, or any selective combination thereof.

According to the voice information control method in the present text creation system, it is possible to create meeting minutes without requiring a special device provided with a large number of microphones and so forth.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2A is a drawing depicting an example of configurations in the text creation system in Embodiment 1;

FIG. 9 is a drawing depicting an example of created minutes;

FIG. 16 is a drawing depicting an example of speech intervals (X) determined by the present text creation system and intervals (Y) other than the speech intervals.

Figure 1A:
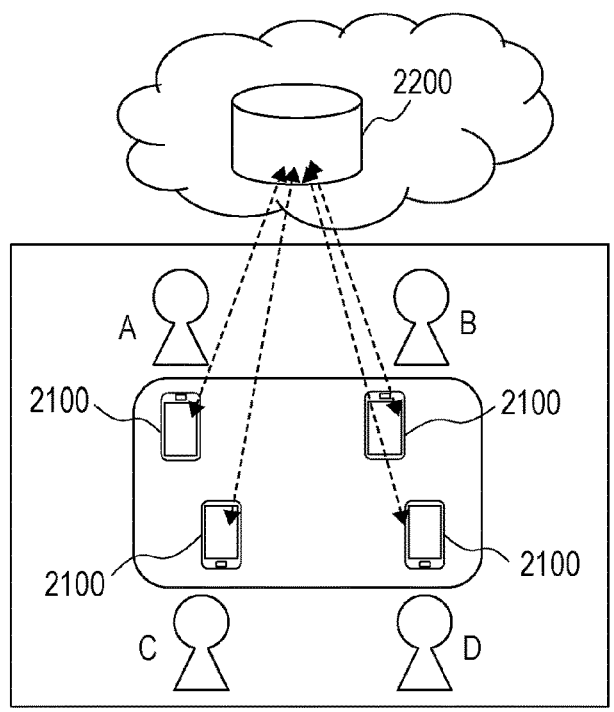
FIG. 1A is a drawing depicting an example of an overview of a text creation system in Embodiment 1.

DETAILED DESCRIPTION (Findings Forming the Basis of the Present Disclosure)

In a conventional text creation system, a special microphone device is required to pick up voice, and there has been insufficient study with regard to methods for easily creating minutes by recognizing people who are speaking and converting voice into text.

Japanese Unexamined Patent Application Publication No. 2008-309856 discloses a system in which a plurality of microphones corresponding to each participant are prepared, voice acquired in each microphone is collected, and minutes are created. Furthermore, a processing method is disclosed for situations such as when the voice of a person other than the participant corresponding to a microphone is mixed in with the voice acquired in the microphone. It is possible to distinguish which participant speech is from which sound source from among a plurality of sound sources by using a method such as carrying out sound source separation with respect to voice acquired in the microphones, for example.

However, as described above, in the text creation system disclosed in Japanese Unexamined Patent Application Publication No. 2008-309856, a special device specifically for the system that includes a large number of microphones is required. There has therefore been a problem in that the device itself consequently becomes expensive. Furthermore, a microphone for each meeting participant is required as described in Japanese Unexamined Patent Application Publication No. 2008-309856, which does not result in a text creation system that is able to flexibly handle a variety of meetings having a different number of participants.

A voice information control method for a terminal device according to the present disclosure is a voice information control method for a terminal device used in a system including a server device which creates text data in accordance with the voice information received from the terminal device, the method including: acquiring plurality items of first voice information; specifying a time interval that includes second voice information which is one of the plurality items of the first voice information, and which includes spoken voice of a first speaker who uses the first terminal device; and transmitting the second voice information included in the specified time interval to the server device.

Furthermore, in one aspect of the present disclosure, the terminal device retains a voice model including voice information relating to the first speaker, and the specifying is performed by comparing the plurality items of the first voice information and the voice mode.

Furthermore, in one aspect of the present disclosure, only the second voice information included in the specified time interval is transmitted to the server device in the transmitting, and the plurality items of the first voice information included in a time interval other than the specified time interval is not transmitted to the server device in the transmitting.

Furthermore, in one aspect of the present disclosure, further comprising: accumulating the second voice information included in the specified time interval into a recording medium in the first terminal device, wherein the accumulated second voice information is transmitted to the server device at a prescribed timing in the transmitting.

Furthermore, in one aspect of the present disclosure, the prescribed timing is a timing at which the plurality items of the first voice information acquired by the acquiring have become equal to or less than a prescribed sound pressure level.

Furthermore, in one aspect of the present disclosure, the prescribed timing is a timing in a time interval other than the specified time interval.

Furthermore, in one aspect of the present disclosure, the prescribed timing is a timing at which the first speaker has instructed the system to terminate by way of the terminal device which the first speaker uses.

Furthermore, in one aspect of the present disclosure, at least one of the acquiring, the specifying, and the transmitting is carried out by a processor included in the terminal device.

Furthermore, a voice information control method for a server device according to the present disclosure is a voice information control method for a server device in a system in a system which creates text data in accordance with voice information received from each of a plurality of terminal devices, the method including: receiving plurality items of the voice information and time information regarding times at which the plurality of items of voice information are acquired by each of the plurality of terminal devices; carrying out voice recognition and text conversion with respect to each of the plurality of items of voice information to thereby create a plurality of items of text data; and integrating the plurality of items of text data in a time-sequential manner in accordance with the time information.

Furthermore, in one aspect of the present disclosure, further comprising: transmitting the integrated plurality of items of text data to some of the terminal devices or all of the terminal devices from among the plurality of terminal devices.

Furthermore, in one aspect of the present disclosure, plurality items of voice information, as the plurality of items of the voice information received from a first terminal device from among the plurality of terminal devices, include second voice information which is one of the plurality items of the first voice information and which includes spoken voice of a first speaker who uses the first terminal device.

Furthermore, in one aspect of the present disclosure, the plurality of items of the voice information received from each of the plurality of terminal devices constitute all of the voice information which each of the plurality of terminal devices acquired while each of the terminal devices is activating the system.

Furthermore, in one aspect of the present disclosure, further comprising: specifying the terminal device used by a speaker who spoke in each speech interval by comparing each of the plurality of items of voice information received from each of the plurality of terminal devices.

Furthermore, in one aspect of the present disclosure, the specifying further comprising: comparing sound pressure levels of each of the plurality of items of voice information received from each of the plurality of terminal devices, and specifying the terminal device that has the highest sound pressure level in a first speech interval as the terminal device used by the speaker in the first speech interval.

Furthermore, in one aspect of the present disclosure, further comprising: specifying second voice information which is one of plurality items first voice information, as the plurality items of the voice information received from a first terminal device from among the plurality of terminal devices, and which includes spoken voice of a first speaker who uses the first terminal device by comparing the plurality items of the first voice information and the plurality of items of the voice information received from a second terminal device from among the plurality of terminal devices; specifying one of the plurality items of the voice information, received from a second terminal device, which does not include spoken voice of a second speaker who uses the second terminal device as noise voice; and removing the specified noise voice from the first voice information before the voice recognition and text conversion are carried out using the second voice information.

Furthermore, in one aspect of the present disclosure, further comprising: creating minutes associated with the terminal devices from which the voice information has been received, the time information, and the text-converted text data; and transmitting the created minutes to some of the terminal devices or all of the terminal devices from among the plurality of terminal devices.

Furthermore, in one aspect of the present disclosure, at least any one of the receiving, the creating, and the integrating is carried out using a processor.

Furthermore, in one aspect of the present disclosure, a terminal device used in a system including a server device which creates text data in accordance with the voice information received from the plurality of terminal devices may be a terminal device including: a voice acquisition unit that acquires first voice information; a control/processing unit that specifies a time interval that includes second voice information which is one of the plurality items of the first voice information, and which includes spoken voice of a first speaker who uses the terminal device; and a communication unit that transmits the second voice information included in the specified time interval to the server device.

Furthermore, in one aspect of the present disclosure, the terminal device includes a recording unit that retains a voice model that includes voice information relating to the first speaker, and the control/processing unit specifies the time interval that includes the second voice information by comparing the plurality items of the first voice information and the voice mode.

Furthermore, in one aspect of the present disclosure, the control/processing unit, by way of the communication unit, transmits only the second voice information included in the specified time interval to the server device, and does not transmit the plurality items of the first voice information included in a time interval other than the specified time interval to the server device.

Furthermore, in one aspect of the present disclosure, at least any one of the voice acquisition unit, the control/processing unit, and the communication unit includes a processor.

(Embodiment 1)

[System Overview]

Figure 1B:
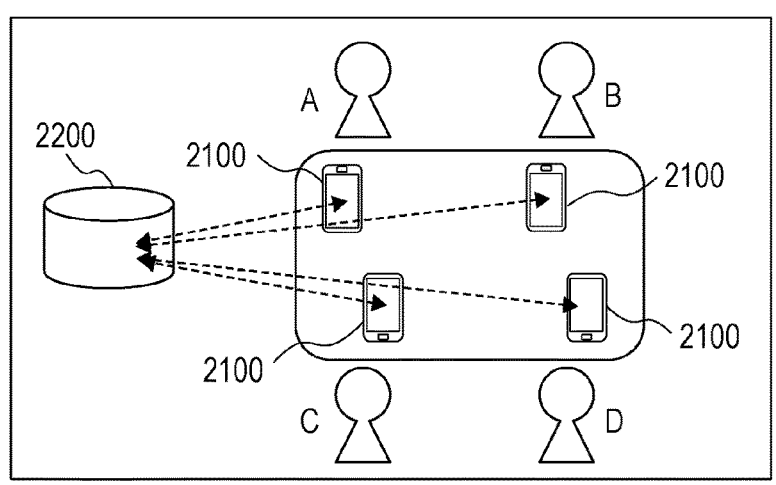
FIG. 1B is a drawing depicting an example of an overview of the text creation system in Embodiment 1.

FIGS. 1A and 1B depict overviews of the present text creation system. The two examples of FIGS. 1A and 1B are given as examples of overviews in which the present text creation system may be adopted; however, the present disclosure is not restricted thereto. Each system is described hereinafter.

In the example of FIG. 1A, all meeting participants A to D each possess a terminal device 2100. The terminal devices 2100 of each of the meeting participants A to D transmit and receive information via the Internet with a server device 2200 arranged outside the room. A method for creating text (minutes) by a voice information control method in the text creation system depicted in FIG. 1A will be described hereinafter.

First, voice of the meeting participants is acquired in the terminal devices 2100 possessed by each of the meeting participants A to D. The terminal devices 2100 possessed by each of the meeting participants A to D then transmit plurality items of acquired voice information to the server device 2200 in real time. The server device 2200 converts the plurality items of the voice information received from each of the terminal devices 2100 of the meeting participants A to D into text data. Furthermore, the server device 2200 integrates each item of text-converted information on the basis of the date and time at which they are received to thereby create minutes. The details of the method for creating minutes will be described later on. The server device 2200 then transmits the created minutes to the terminal devices 2100 possessed by each of the meeting participants A to D. The terminal devices 2100 are mentioned here; however, it should be noted that any kind of device may be adopted as long as the device is able to acquire voice.

In the example of FIG. 1B, all of the meeting participants A to D each possess a terminal device 2100. The terminal devices 2100 of each of the meeting participants A to D transmit and receive information by wired communication or wireless communication with a server device 2200 arranged inside the room. The point that the server device 2200 is arranged inside the room is different compared with FIG. 1A, but other than this the systems are the same and a description is therefore omitted. A wireless standard such as Wi-Fi or Bluetooth (registered trademark) may be used as a method for transmitting and receiving information with the server device 2200 by wireless communication in the example of FIG. 1B. The terminal devices 2100 are mentioned here; however, it should be noted that any kind of device may be adopted as long as the device is able to acquire voice.

Hereinafter, the configuration of each device and the processing flow for creating minutes will be described, and a description is given of an example in which basically the system of FIG. 1A is used.

[Configuration of Each Device]

Each configuration in the text creation system in Embodiment 1 will be described using FIG. 2A. A description is given regarding the configuration of each device in the system described in FIG. 1A; however, the present disclosure is not restricted thereto, and some or all of the configurations/units provided in the terminal devices 2100 may be provided in the server device 2200, and some or all of the configurations/units provided in the server device 2200 may be provided in the terminal devices 2100.

The terminal devices 2100 are provided with a communication unit 2101, a control/processing unit 2102, a recording unit 2103, a voice acquisition unit 2104, a display unit 2105, an operation unit 2106, and a voice reproduction unit 2107.

The communication unit 2101 may include a processing circuit (communication circuit) that carries out communication, for example. The communication unit 2101 transmits and receives information with the server device 2200 and other devices via the Internet. Transmitting and receiving information via the Internet is mentioned here; however, information may be transmitted and received with the server device 2200 by implementing a physical wired connection.

The control/processing unit 2102 processes all acquired information and controls all configurations, and, for example, processes plurality items of voice information acquired by the voice acquisition unit 2104, which is described later on. The control/processing unit 2102 is an electronic component that includes a processor (also referred to as a processing circuit) having what is referred to as an information processing function. A central processing unit (CPU) or a microcomputer (also referred to as a microprocessor) or the like is included as the processor, for example.

The control/processing unit 2102 may be configured in such a way that the control/processing unit 2102 functions as a result of a CPU executing a program recorded in a memory such as a read-only memory (ROM), which is not depicted, or the recording unit 2103, for example.

Furthermore, the control/processing unit 2102 may be configured with the function realized by executing the aforementioned program being integrated in a microcomputer, for example. The specific functional configurations of the control/processing unit 2102 will be described later on using FIGS. 3A and 3B.

The recording unit 2103 records all information. For example, plurality items of voice information acquired by the voice acquisition unit 2104 are recorded temporarily or for a prescribed period in the recording unit 2103. The recording unit 2103 is a writable recording medium such as a memory or a hard disk so to speak.

The voice acquisition unit 2104 acquires voice information. The voice acquisition unit 2104 may include a processing circuit that processes acquired voice, for example. The acquired voice information is subjected to AD conversion processing, for example, and recorded in the recording unit 2103, or is processed by the control/processing unit 2102, or is transmitted to the server device 2200 by the communication unit 2101. The voice acquisition unit 2104 is a microphone or the like so to speak.

The display unit 2105 displays all information. The display unit 2105 is a display so to speak.

The operation unit 2106 is an interface that receives an operation or input from a user. There are no particular restrictions regarding the input method. The input method may be a touch panel-type of input system or button input. The operation unit 2106 is a display or a display panel so to speak.

The voice reproduction unit 2107 reproduces voice and is a speaker so to speak. The voice reproduction unit 2107 is not an essential configuration.

The server device 2200 is provided with a communication unit 2201, a control/processing unit 2202, and a recording unit 2203. The server device 2200 is able to connect with each terminal device 2100 via a network. The server device 2200 is a server arranged on a cloud, for example, and there are no particular restrictions regarding the installation location and so forth.

The communication unit 2201 may include a processing circuit (communication circuit) that carries out communication, for example. The communication unit 2201 receives the plurality items of the voice information acquired by each terminal device 2100, and transmits information processed by the control/processing unit 2202, which is described hereinafter, to the terminal devices 2100.

The control/processing unit 2202 processes the received plurality items of the voice information. The control/processing unit 2202 is an electronic component that includes a processor having an information processing function so to speak. A CPU or a microcomputer is included as a processor, for example.

The control/processing unit 2202 may be configured in such a way that the control/processing unit 2202 functions as a result of a CPU executing a program recorded in a memory such as a ROM, which is not depicted, or the recording unit 2203, for example.

Furthermore, the control/processing unit 2202 may be configured with the function realized by executing the aforementioned program being integrated in a microcomputer, for example.

The processing and so forth carried out by the control/processing unit 2202 will be described later on.

The recording unit 2203 records information (voice information and so forth) acquired from all terminal devices. The recording unit 2203 is a writable recording medium such as a memory or a hard disk so to speak.

The aforementioned is a description of the configurations of each of the devices; however, the aforementioned terminal devices 2100 and server device 2200 do not necessarily have to be provided with all of the configurations described in FIG. 2A. Some of those configurations may not be provided.

Figure 2B:
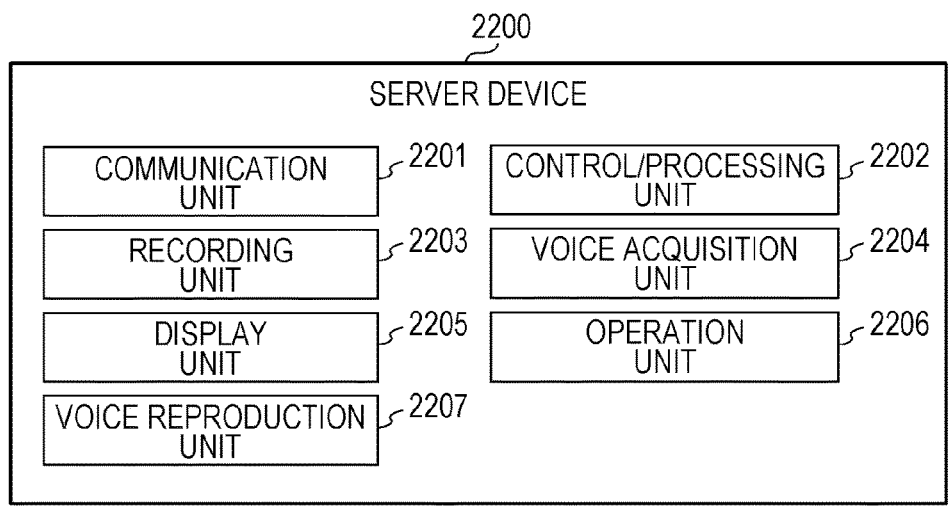
FIG. 2B is a drawing depicting an example of configurations in the text creation system in Embodiment 1.

Furthermore, FIG. 2B depicts an example of configurations of the server device 2200 in the system depicted in FIG. 1B. As depicted in FIG. 2B, in this case, the server device 2200 is a device specifically for a text creation system, and all of the configurations are aggregated within the server device 2200. Each configuration is the same as in FIG. 2A, and therefore the same names or reference numbers are used and descriptions thereof are omitted.

[Functional Configurations of Control/Processing Unit]

Figure 3A:
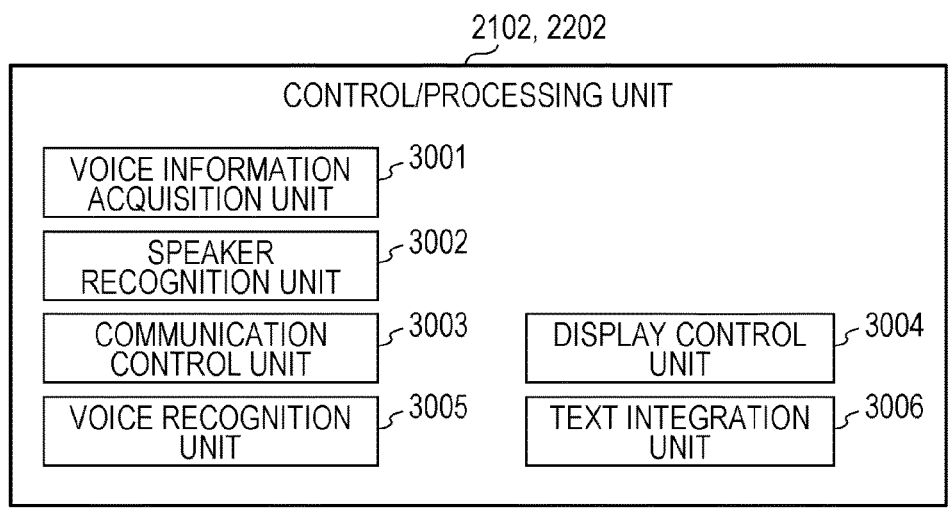
FIG. 3A is a drawing depicting an example of functional configurations of a control/processing unit.

FIG. 3A is a drawing depicting an example of the functional configurations of the control/processing unit 2102 or the control/processing unit 2202. Each configuration is described hereinafter.

It should be noted that, in the case where the control/processing unit 2102 is provided with some of the functional configurations depicted in FIG. 3A, the control/processing unit 2202 may be provided with the functional configurations of FIG. 3A that are not provided in the control/processing unit 2102. Furthermore, in the case where the control/processing unit 2202 is provided with all of the functional configurations of FIG. 3A, it is feasible for the control/processing unit 2102 to not be provided with even one of the functional configurations described in FIGS. 3A and 3B. In this case, voice information acquired by the voice acquisition unit 2104 of a terminal device 2100 is transmitted as it is by the communication unit 2101 to the server device 2200.

Hereinafter, a description is given with regard to an example in which the functional configurations are shared between the control/processing unit 2102 and the control/processing unit 2202 as in FIG. 3B; however, the present disclosure is by no means restricted thereto.

Figure 3B:
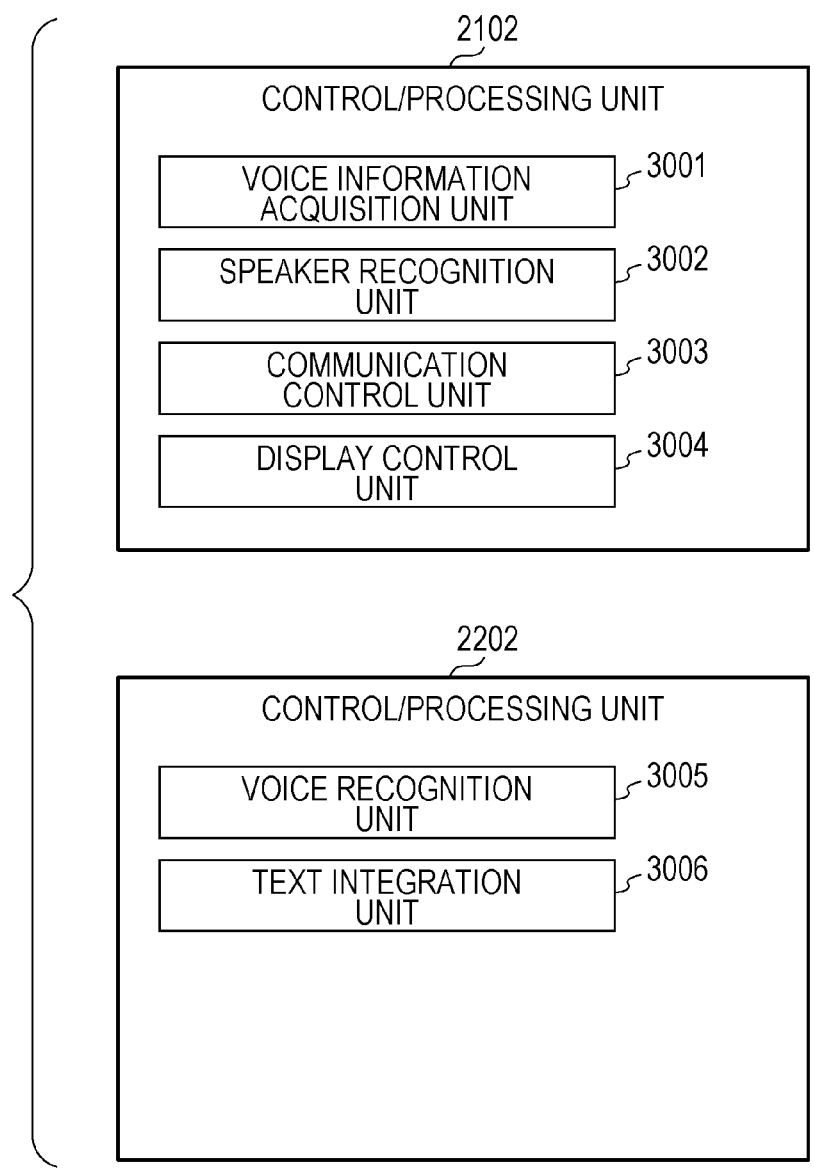
FIG. 3B is a drawing depicting an example of the functional configurations of the control/processing unit.

As depicted in FIG. 3B, the control/processing unit 2102 of a terminal device 2100 is provided with a voice information acquisition unit 3001, a speaker recognition unit 3002, a communication control unit 3003, and a display control unit 3004. Furthermore, the control/processing unit 2202 of the server device 2200 is provided with a voice recognition unit 3005 and a text integration unit 3006.

A voice information control method for a text creation system in the present embodiment is a voice information control method for a terminal device used in a system including a server device which creates text data in accordance with the voice information received from the terminal device, the method including: acquiring plurality items of first voice information; specifying a time interval that includes second voice information which is one of the plurality items of the first voice information, and which includes spoken voice of a first speaker who uses the first terminal device; and transmitting the second voice information included in the specified time interval to the server device.

Furthermore, a voice information control method for a text creation system in the present embodiment is a voice information control method for a server device in a system which creates text data in accordance with voice information received from each of a plurality of terminal devices, the method including: receiving plurality items of the voice information and time information regarding times at which the plurality of items of voice information are acquired by each of the plurality of terminal devices; carrying out voice recognition and text conversion with respect to each of the plurality of items of voice information to thereby create a plurality of items of text data; and integrating the plurality of items of text data in a time-sequential manner in accordance with the time information.

Hereinafter, the flow of the operation and processing of the functional configurations are described using the flowchart of FIG. 4. It should be noted that the processing of the terminal devices 2100 and the processing of the server device 2200 are described in the present flowchart. The processing of the terminal devices 2100 and the server device 2200 is described using a sequence diagram in FIG. 11.

First, in step S4001, the voice information acquisition unit 3001 of the control/processing unit 2102 acquires plurality items of voice information acquired by the voice acquisition unit 2104 (a microphone, in other words). At such time, processing such as AD conversion may be carried out in the control/processing unit 2102, or the voice information acquisition unit 3001 of the control/processing unit 2102 may acquire plurality items of digitalized voice information with the voice acquisition unit 2104 carrying out AD conversion. Furthermore, the plurality items of voice information recorded by the recording unit 2103 may be acquired at such time. In other words, the plurality items of the voice information acquired by the voice acquisition unit 2104 may all be temporarily recorded in the recording unit 2103.

Figure 5:
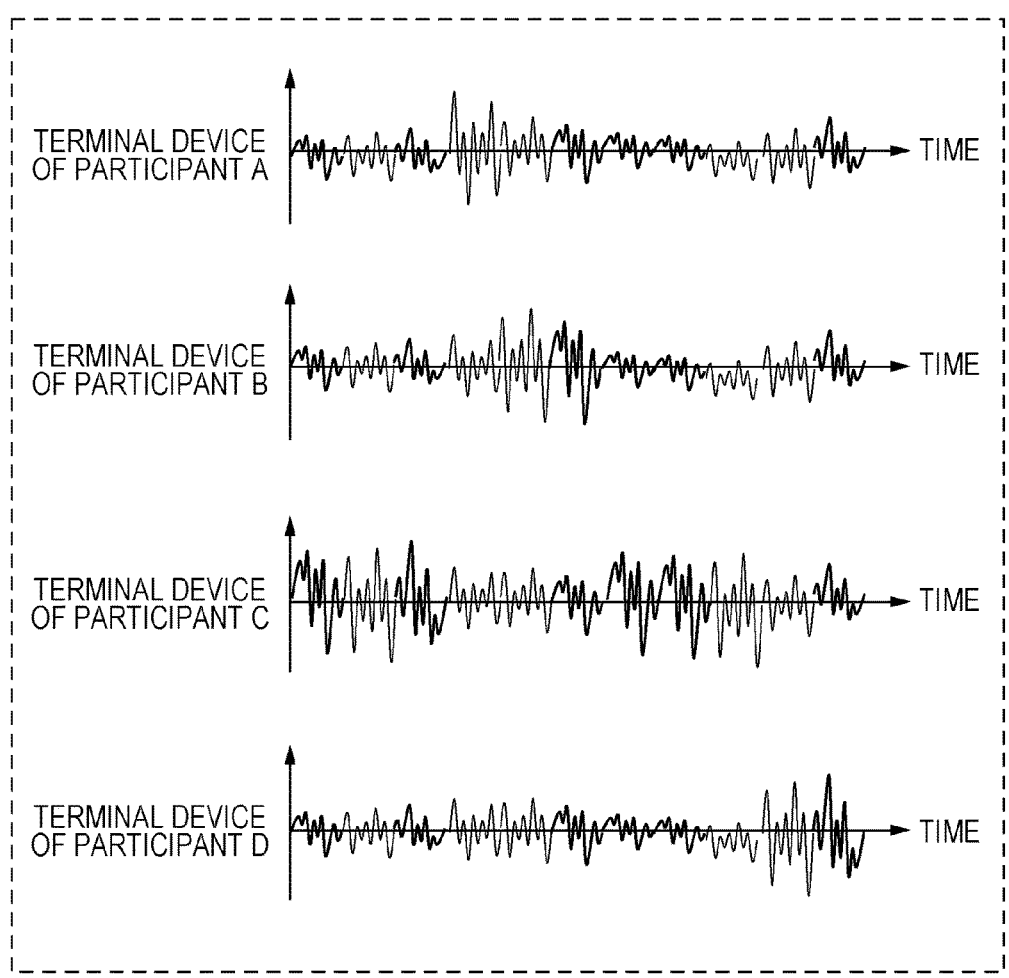
FIG. 5 is a drawing depicting an example representation of voice information acquired by each terminal device.

FIG. 5 is a drawing depicting an example representation of voice information acquired by each terminal device 2100 of the participants A to D.

A voice signal obtained when sound is picked up by a microphone of each terminal device 2100, for example, will be described as an example of voice information.

The horizontal axis in FIG. 5 represents the time at which sound is picked up, and the vertical axis represents the level of a voice signal.

As depicted in FIG. 5, voice signals acquired by each terminal device 2100 at prescribed time intervals are acquired and retained by the voice information acquisition unit 3001. The acquisition of plurality items of voice information from the terminal devices 2100 used by each of the four meeting participants A to D in the example depicted in FIG. 1A is depicted here.

Next, in step S4002, the speaker recognition unit 3002 of the control/processing unit 2102 sequentially carries out speaker recognition with respect to each item of voice information acquired by the voice information acquisition unit 3001.

As depicted in FIG. 5, there is a possibility of voice other than the owner of a terminal device and noise other than the voice of the meeting participants A to D also being included in the voice information acquired by each terminal. In this regard, the terminal devices 2100 used by each of the meeting participants A to D are terminals such as smartphones, and therefore the voice of each participant is often acquired in advance from telephone calls and so forth, and it is easy to acquire voice information of an owner.

Thus, a voice model for participant A is generated from voice information acquired in advance by the recording unit 2103 of the terminal device 2100 of participant A, and is retained in advance in the recording unit 2103, for example. The voice model for participant A is data for identifying participant A that is created based on data corresponding to a voice signal of participant A obtained when speech of participant A is picked up by the microphone of the terminal device 2100, for example. The terminal device 2100 of participant A then matches the retained voice model for participant A with each of the acquired plurality items of the voice information to thereby be able to determine whether or not speech of the owner (participant A) is included in the acquired plurality items of the voice information.

Likewise, in the terminal device 2100 of participant B, a voice model for participant B is generated from voice information acquired in advance, and is retained in advance in the recording unit 2103 of the terminal device 2100 of participant B.

Likewise, in the terminal device 2100 of participant C, a voice model for participant C is generated from voice information acquired in advance, and is retained in advance in the recording unit 2103 of the terminal device 2100 of participant C.

Likewise, in the terminal device 2100 of participant D, a voice model for participant D is generated from voice information acquired in advance, and is retained in advance in the recording unit 2103 of the terminal device 2100 of participant D.

Then, as with the terminal device 2100 of participant A, in the terminal devices 2100 of each of the participants B to D, the retained voice model of the owner of the terminal device 2100 is matched with each of the acquired plural items of the voice information to thereby determine whether or not speech of the owner of the terminal device 2100 is included in the acquired plural items of the voice information.

Furthermore, if the user is prompted to carry out initial registration (speech) when the present text creation system is first used, a voice model for the user who possesses the terminal in question is able to be generated and retained.

In other words, in one aspect of the present voice information control method, a terminal device retains a voice model including voice information relating to a first speaker, and compares the plurality items of the voice information and the voice model to thereby specify a time interval that includes the second voice information from among the plurality items of the voice information.

Furthermore, the server device 2200 may retain a database in which the IDs of the owners of each the terminals and voice models are managed in association with each other. With regard to the method for constructing the database, it is feasible to make users who are to use the present text creation system carry out initial registration and so forth, but there are no particular restrictions with regard thereto. In such case, for example, it is possible for a terminal device to retain a voice model for that terminal as a result of processing such as ID information being transmitted from each terminal device to the server device 2200 when the system is activated, the server device 2200 extracting a voice model corresponding to each ID, and the server device 2200 transmitting the extracted voice models to the terminal devices 2100.

Figure 6:
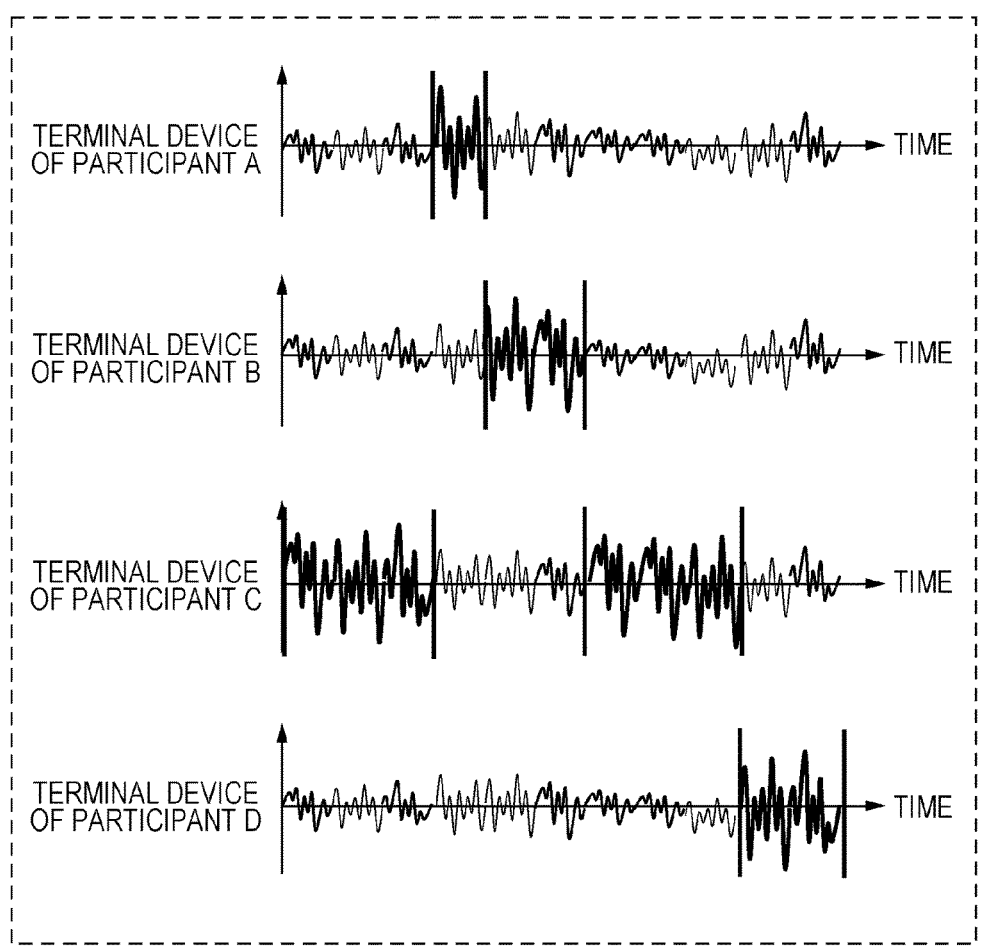
FIG. 6 is a drawing depicting an example representation in which intervals in which the owner of each terminal device has spoken are specified within the voice information.

Next, in step S4003, the speaker recognition unit 3002 in the control/processing unit 2102 of each terminal device 2100 determines whether or not voice information of the owner of that terminal device is included within the acquired plurality items of the voice information, on the basis of the result of carrying out speaker recognition processing in step S4002. FIG. 6 depicts a representation in which intervals in which the owner of each terminal device has spoken are specified in the voice information of FIG. 5.

Next, in step S4004, the communication control unit 3003 in the control/processing unit 2102 of each terminal device 2100 controls the communication unit 2101 in such a way that voice information including speech intervals of the owners of each terminal is transmitted together with time information to the server device 2200.

In other words, in one aspect of the voice information control method of the present embodiment, the terminal devices transmit only the second voice information included in a specified time interval to the server device, and do not transmit the plurality items of the first voice information included in a time interval other than the specified time interval to the server device.

Furthermore, in one aspect of the present voice information control method, plurality items of first voice information, corresponding to the plurality of items of voice information received by the server device from a first terminal device from among the plurality of terminal devices, include second voice information which is one of the plurality items of the first voice information and which includes spoken voice of a first speaker who uses the first terminal device.

Time information is the time at which the voice information of an owner has started and the time at which the voice information has ended, for example. The time is synchronized among each terminal in advance. There are no restrictions regarding the synchronization method.

Figure 7:
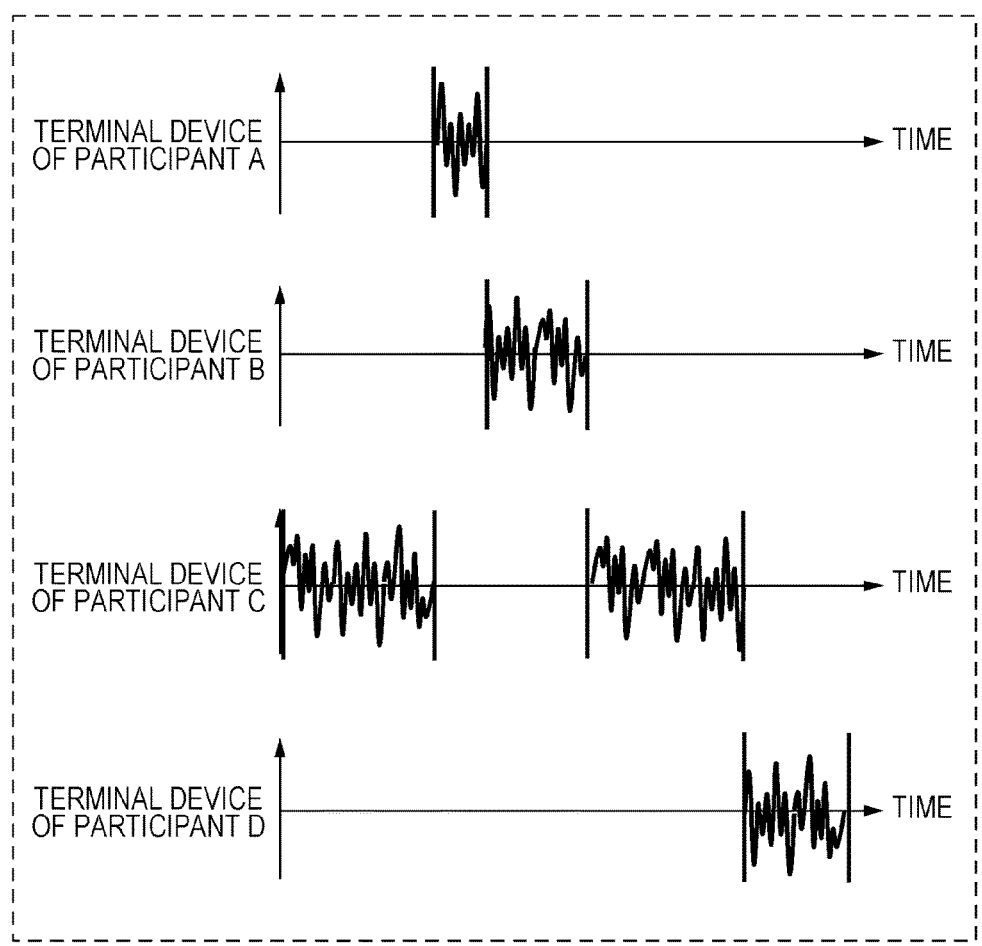
FIG. 7 is a drawing depicting an example representation of the voice information of each of the terminals that is transmitted to a server.

FIG. 7 depicts a representation of voice information of each of the terminals that is transmitted to the server. In this regard, the communication control unit 3003 transmits, together with time information, only segments recognized as the voice of the owner of each terminal from among the plurality of items of the voice information acquired at each terminal as depicted in FIG. 7. It should be noted that the information that is transmitted is not restricted to the aforementioned, and all of the voice information may be transmitted. In such case, flag information or the like is added with respect to the segments recognized as the voice of the owner of each terminal determined in each terminal, and is transmitted in such a way as to be able to be determined by the control/processing unit 2202 of the server device 2200.

It should be noted that the communication control unit 3003 is not particularly restricted with regard to the timing at which the voice information is transmitted to the server. For example, the voice information may be transmitted at prescribed intervals (every 30 seconds, every 60 seconds, and so forth) determined in advance. Furthermore, the voice information may be transmitted at a timing at which each terminal device 2100 no longer recognizes voice of the owner of that terminal device. Furthermore, the voice information may be transmitted at a timing at which the sound pressure level of voice acquired by each terminal device 2100 has become equal to or less than a prescribed sound pressure level. Furthermore, the voice information may all be transmitted in one batch after step S4005, which is the end of the meeting.

In other words, in one aspect of the present voice information control method, the first terminal device accumulates the second voice information included in the specified time interval into a recording medium in the first terminal device, and transmits the accumulated second voice information to the server device at a prescribed timing.

Furthermore, in one aspect of the present voice information control method, the prescribed timing is a timing at which the plurality items of the first voice information acquired by the acquiring have become equal to or less than a prescribed sound pressure level.

Furthermore, in one aspect of the present voice information control method, the prescribed timing is a timing in a time interval other than the specified time interval that includes second voice information.

Furthermore, in one aspect of the present voice information control method, the prescribed timing is a timing at which the first speaker has instructed the system to terminate by way of the terminal device which the first speaker uses.

Next, in step S4005, the communication control unit 3003 of a terminal device 2100 notifies the end of the meeting to the server device 2200 if it is explicitly indicated from a user that the meeting has ended.

With regard to the method for notifying that the meeting has ended, the display control unit 3004 may display a meeting end button on the display unit 2105 of each terminal, or the meeting may be ended by a specific word being spoken.

Furthermore, processing does not necessarily have to proceed to step S4006 after notification of the end of the meeting. In other words, text conversion processing and so forth by the server device 2200 carried out in step S4006 may be carried out as appropriate after the voice information has been transmitted to the server device in step S4004.

Next, in step S4006, the voice recognition unit 3005 in the control/processing unit 2202 of the server device 2200 carries out voice recognition with respect to the voice information acquired in step S4004, and the voice information is converted into text data as character information.

Figure 8:
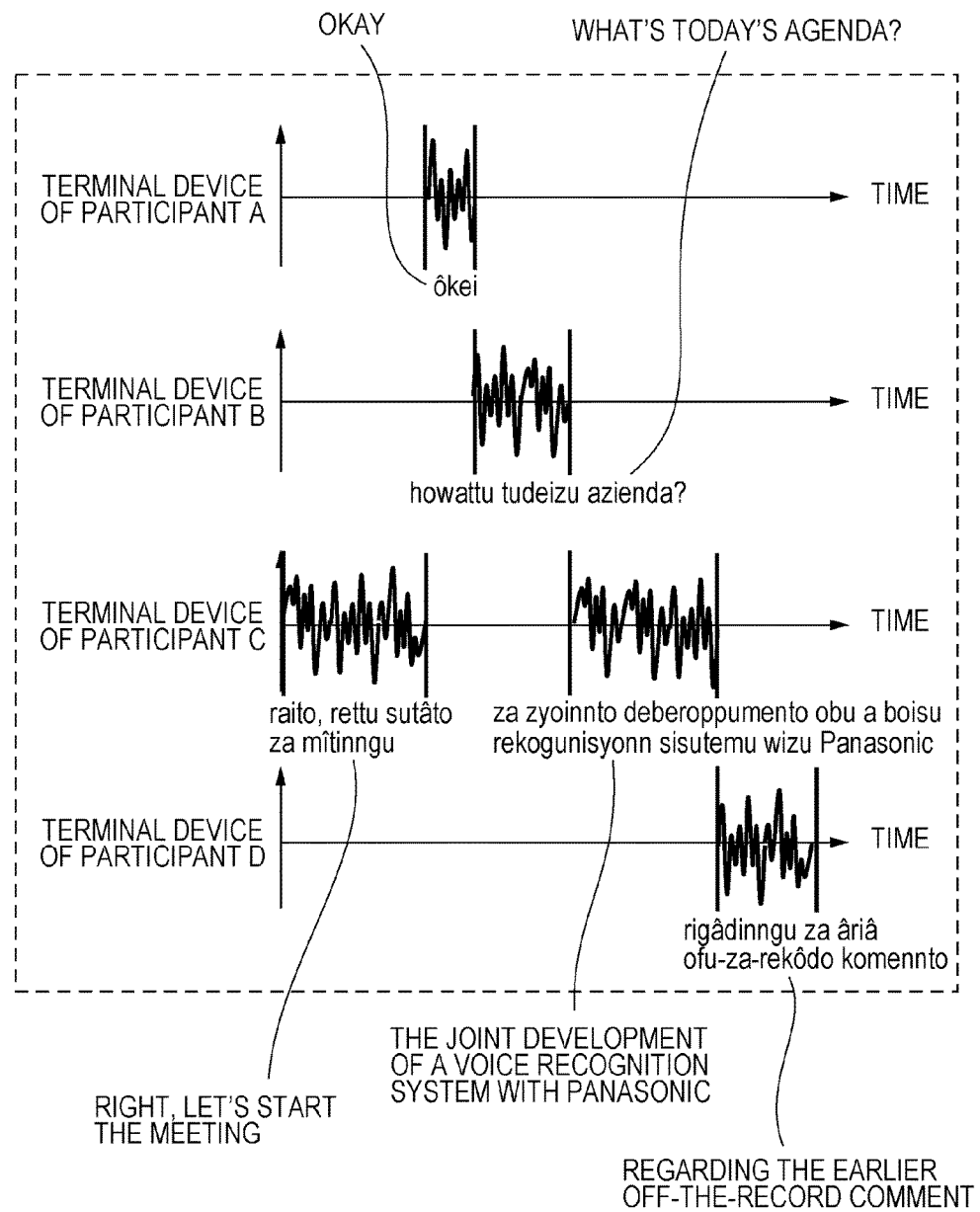
FIG. 8 is a drawing depicting an example representation in which each item of voice information acquired by the server device from the terminal devices is converted into text.

FIG. 8 depicts a representation in which each item of voice information is converted into text data with regard to the voice information received by the server device 2200 from the terminal devices 2100.

The text conversion of the voice information may be carried out by transmitting the voice information to the server device 2200 in step S4004. Furthermore, in the case where the terminal devices 2100 have a function relating to the conversion of voice into text, the voice information may be converted into text at the terminal side, and only the text-converted voice and time information may be transmitted to the server.

Next, in step S4007, the text integration unit 3006 in the control/processing unit 2202 of the server device 2200 integrates text-converted sentences and uses speaker information and time information to create minutes.

An example of the created minutes is depicted in FIG. 9. At such time, all of the information that is able to be acquired may be used or only a portion thereof may be used.

Next, in step S4008, the communication unit 2201 of the server device 2200 transmits the created minutes to each terminal device 2100. In this regard, the information that is transmitted to each terminal device 2100 may each be the same information or may each be different information.

In other words, in one aspect of the present voice information control method, integrated plurality of items of text data is transmitted to some of the terminal devices or all of the terminal devices from among the plurality of terminal devices.

Figure 10A:
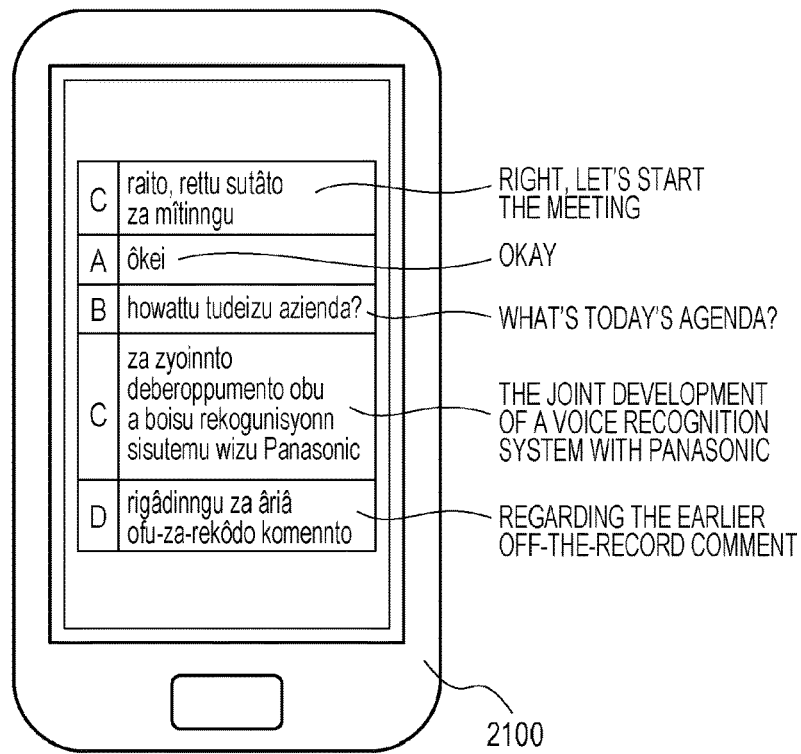
FIG. 10A is a drawing depicting an example in which minutes transmitted by a communication unit of the server device are displayed on a terminal device.
Figure 10B:
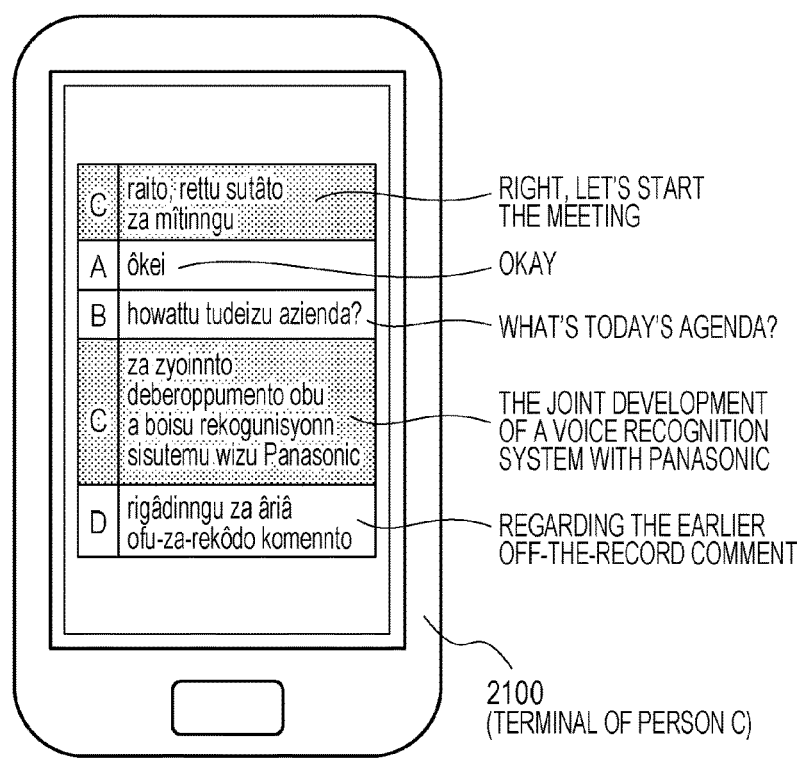
FIG. 10B is a drawing depicting an example in which minutes transmitted by the communication unit of the server device are displayed on a terminal device.

FIGS. 10A and 10B depict examples in which minutes transmitted by the communication unit 2201 of the server device 2200 in step S4008 are displayed on a terminal device 2100. FIG. 10A is a display example of the case where the same display is implemented by each terminal device, and FIG. 10B is a display example of the case where a different display is implemented by each terminal device. In FIG. 10A, the speaker and spoken content are displayed in a time-sequential manner, and the same display is implemented by each terminal device. In FIG. 10B, the speaker and spoken content are displayed in a time-sequential manner as in FIG. 10A; however, on the terminal device 2100 of person C who is a meeting participant, for example, the spoken content of person C is displayed with a different display format from the spoken content of other speakers. In this regard, a variety of different display formats are feasible using different colors, fonts, or character sizes or the like, and there are no particular restrictions with regard thereto.

It should be noted that it is permissible for the minutes to be amendable on each terminal device 2100 after having being transmitted to each terminal, and in such case, control may be performed in such a way that it is possible to amend only the portions spoken by oneself. If the display format is altered with respect to the spoken content of a terminal owner as depicted in FIG. 10B, the speaker is able to visually grasp the text data that is able to be amended, and ease of use is therefore high. Furthermore, the amendable scope may be different depending on the user. For example, it is permissible for the minutes to be able to be amended only by a representative terminal device 2100. In this regard, it is feasible it to be possible for a user to set a representative terminal device 2100 when the present system is activated.

Figure 11:
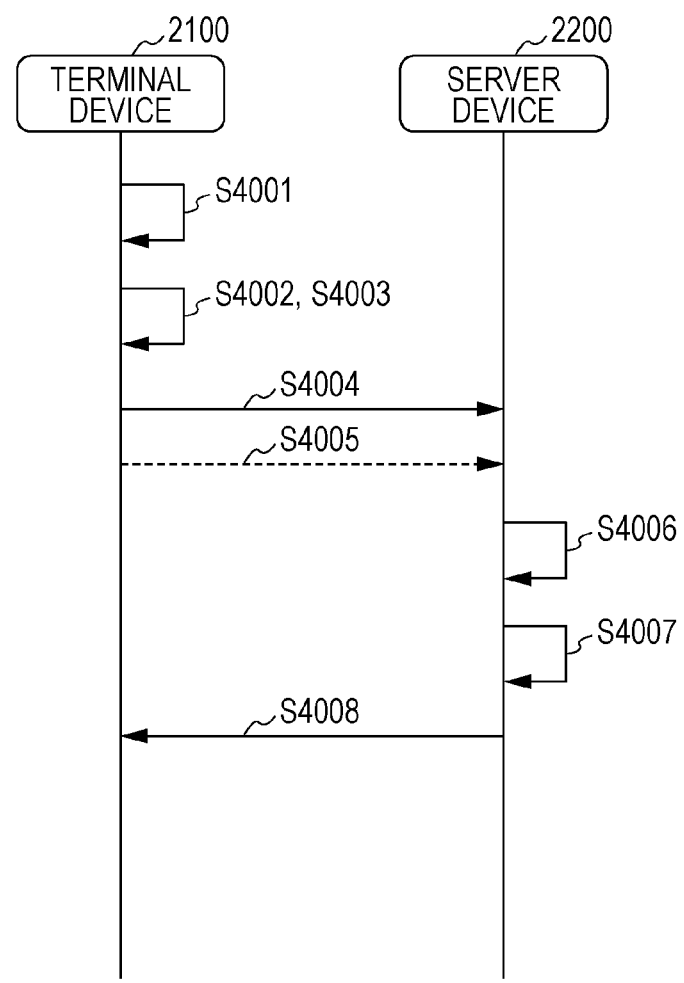
FIG. 11 is a sequence diagram depicting an example of the processing of the voice information control method in the text creation system in the present embodiment.

FIG. 11 illustrates a sequence diagram depicting an example of the processing in the voice information control method in the text creation system in the present embodiment. FIG. 11 depicts whether each step depicted in the flowchart of FIG. 4 is carried out by a terminal device 2100 or the server device 2200. The sequence diagram depicted in FIG. 11 indicates that step S4001, step S4002, step S4003, step S4004, and step S4005 are processing that is carried out in the terminal device 2100.

Furthermore, it is indicated that step S4006, step S4007, and step S4008 are processing that is carried out in the server device 2200.

Figure 4:
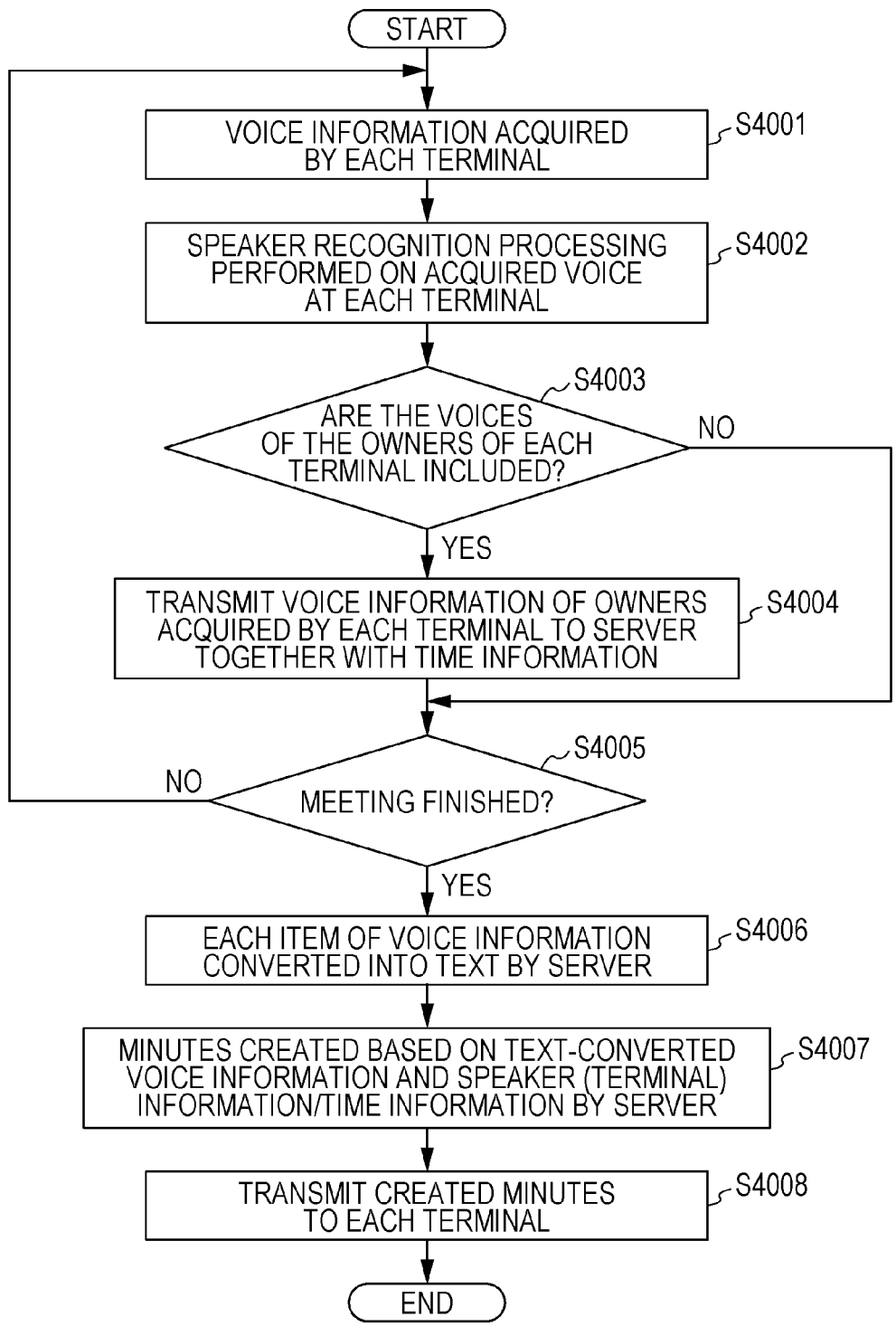
FIG. 4 is a flowchart depicting an example of the operation and processing of the functional configurations of the text creation system.

The same reference numbers as in FIG. 4 are indicated in the sequence diagram depicted in FIG. 11 because the processing is the same, and a description is therefore omitted in this regard.

It should be noted that FIG. 11 depicts the processing between one terminal device 2100 and the server device 2200; however, in the case where there are a plurality of meeting participants, the processing of step S4001 to step S4005 is carried out in the terminal device 2100 possessed by each of the participants.

In such case, in the server device 2200, the processing of step S4006 and step S4007 is carried out using the voice information transmitted from each terminal device 2100.

Furthermore, in step S4008 carried out in the server device 2200, created minutes are transmitted to each terminal device 2100 of the participants who are participating in the meeting, for example.

As described above, according to the voice information control method in the text creation system in the present embodiment, voice is picked up in terminal devices brought by each participant without a large number of microphones being required. Furthermore, in the case where voice recognition and text conversion processing are carried out on a cloud server via a network with respect to picked up voice as depicted in FIG. 1A, it is not necessary for the meeting participants to prepare devices specifically for a text creation system. Furthermore, each person may attend having installed an application that executes the present text creation system with respect to an individually owned terminal device (smartphone or the like), therefore eliminating labor such as a meeting organizer preparing sufficient microphones for the participants each time a meeting is held.

Furthermore, according to the voice information control method in the present text creation system, by carrying out speaker recognition processing in each terminal, it is possible to transmit to the server only voice that includes speech of the owner of the terminal in question. It is therefore possible to reduce the amount of voice information that is transmitted.

(Modified Example 1 in Embodiment 1)

Figure 12:
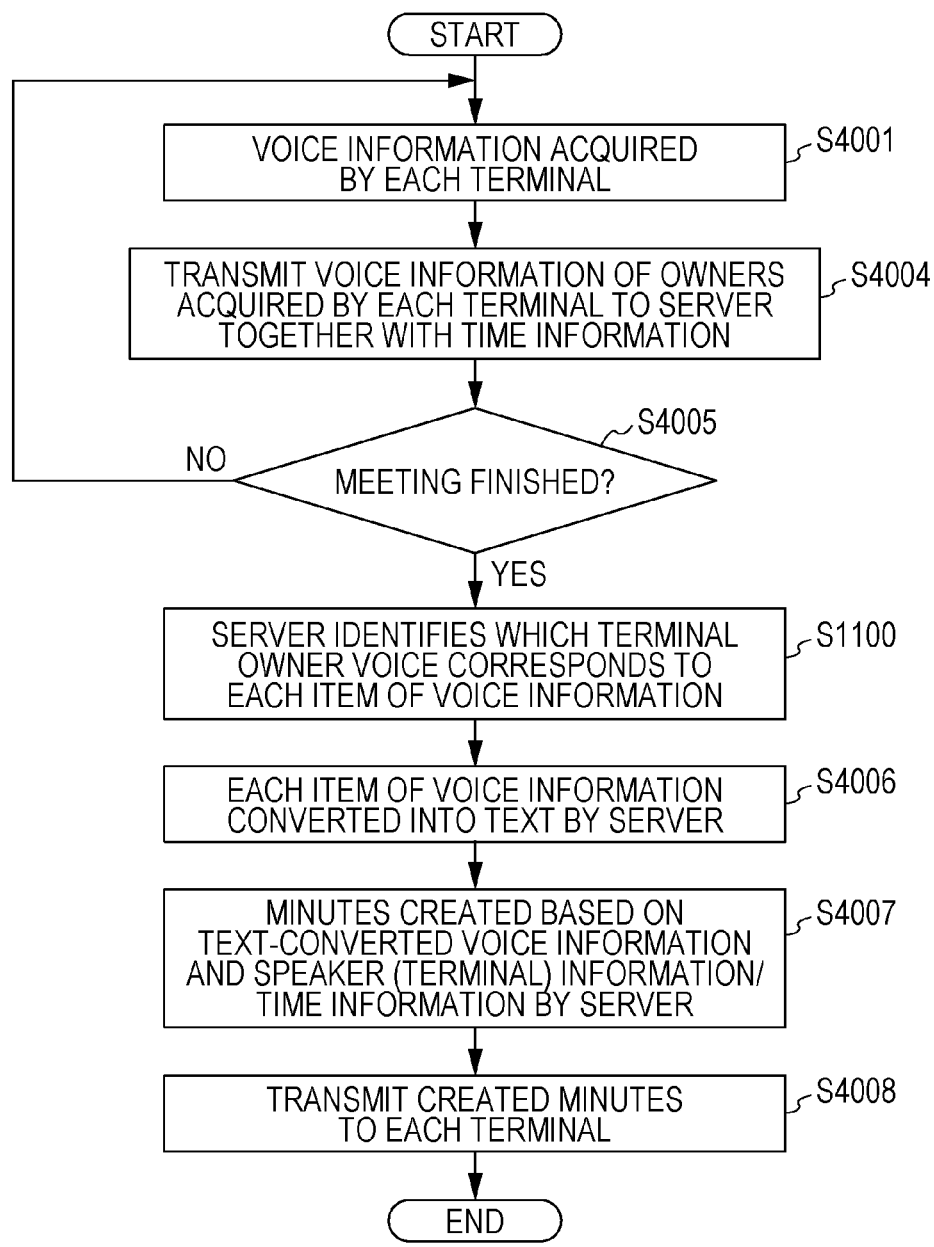
FIG. 12 is a flowchart depicting the flow of the operation and processing of functional configurations of a text creation system in Modified Example 1 of Embodiment 1.
Figure 13:
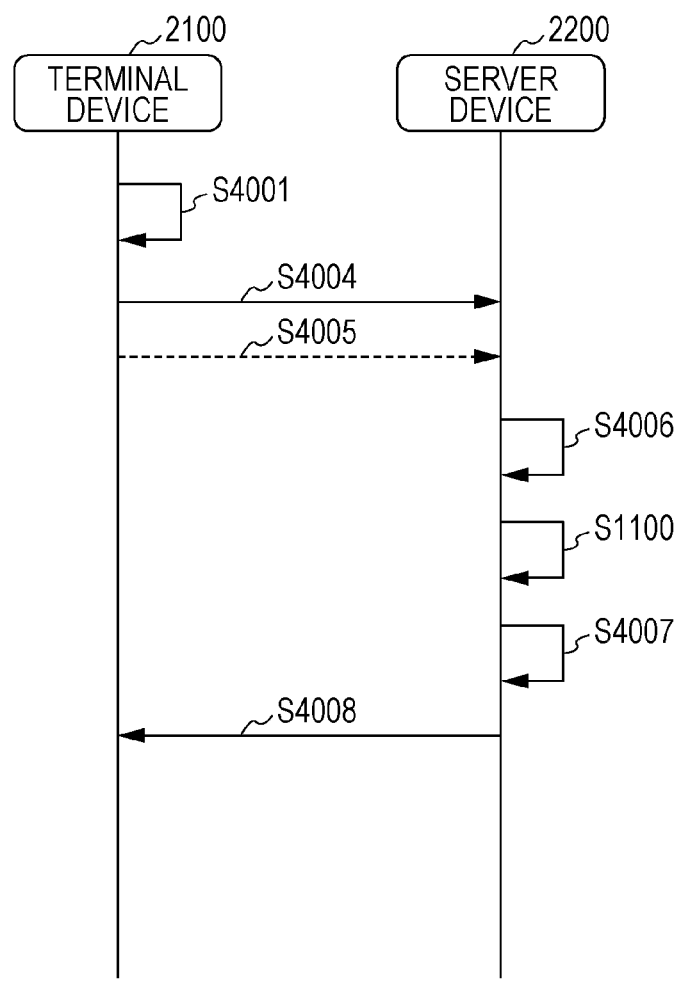
FIG. 13 is a sequence diagram depicting an example of the processing of a voice information control method in the text creation system in Modified Example 1 of Embodiment 1.

A voice information control method of Modified Example 1 in the present embodiment will be described hereinafter. In the present modified example, the processing for speaker recognition carried out in step S4002 and step S4003 in the system of the present embodiment described in FIG. 4 is omitted, and the amount of processing on the terminal device 2100 side is reduced. A flowchart and a sequence diagram regarding this modified example are depicted in FIG. 12 and FIG. 13, respectively. A description is given hereinafter focusing on processing that is different from the flowchart of FIG. 4.

Step S4001 and step S4004 are the same as in the processing of FIG. 4. However, step S4002 and step S4003 depicted in FIG. 4 are not executed by a terminal device 2100 in the present modified example. In other words, in this case, all of the plurality items of the voice information acquired by each terminal is transmitted to the server device 2200 in step S4004.

In other words, in one aspect of the present voice information control method, the plurality of items of voice information received from each of the plurality of terminal devices constitute all of the voice information which each of a plurality of terminal devices acquired while each of the terminal devices is activating the system.

The processing of step S4005 is also the same as in the processing of FIG. 4.

Then, in step S1100, the control/processing unit 2202 of the server device 2200 identifies the voice of the owner of a terminal device 2100 to which each item of voice information corresponds. Specifically, at a certain time, the sound pressure levels of a plurality of items of voice information acquired by each terminal device 2100 are compared, and it is determined that the terminal device 2100 that has acquired voice at the highest sound pressure level is the terminal device 2100 possessed by the speaker at that time.

In other words, in one aspect of the present voice information control method, further comprising: specifying the terminal device used by a speaker in each speech interval by comparing each of a plurality of items of voice information received from each of a plurality of terminal devices.

In other words, in one aspect of the present voice information control method, the specifying further comprising: comparing sound pressure levels of each of the plurality of items of voice information received from each of the plurality of terminal devices; and specifying the terminal device that has the highest sound pressure level in a first speech interval as the terminal device used by the speaker in the first speech interval.

Here, sound pressure levels are compared to determine the terminal of a speaker, but it should be noted that the present disclosure is not restricted thereto. In the case where the server device 2200 retains a database in which the IDs of terminal owners and voice models are managed in association with each other, speaker identification can be carried out on the server device 2200. Thus, the terminal device 2100 of a speaker at each point in time can thereby be specified.

Then, in step S4006, each item of voice information is converted into text data. The present step is the same as in the processing described in FIG. 4 and a description is therefore omitted.

Then, in step S4007, information obtained by carrying out text conversion with respect to voice acquired in a terminal determined as the speaker at each time determined in step S1100 is integrated.

Step S4008 is the same as in the processing of FIG. 4.

FIG. 13 is a sequence diagram depicting an example of processing for the voice information control method of Modified Example 1 in the present embodiment. FIG. 13 depicts whether each step depicted in the flowchart of FIG. 12 is carried out by a terminal device 2100 or the server device 2200.

The sequence diagram depicted in FIG. 13 indicates that step S4001, step S4004, and step S4005 are processing that is carried out in the terminal device 2100.

Furthermore, it is indicated that step S4006, step S1100, step S4007, and step S4008 are processing that is carried out in the server device 2200.

Furthermore, the same reference numbers as in FIG. 12 are indicated in the sequence diagram of FIG. 13 because the processing is the same as that depicted in FIG. 12, and a description is therefore omitted here.

According to the aforementioned modified example, the amount of processing at the terminal device 2100 side can be reduced.

(Modified Example 2 in Embodiment 1)

Figure 14:
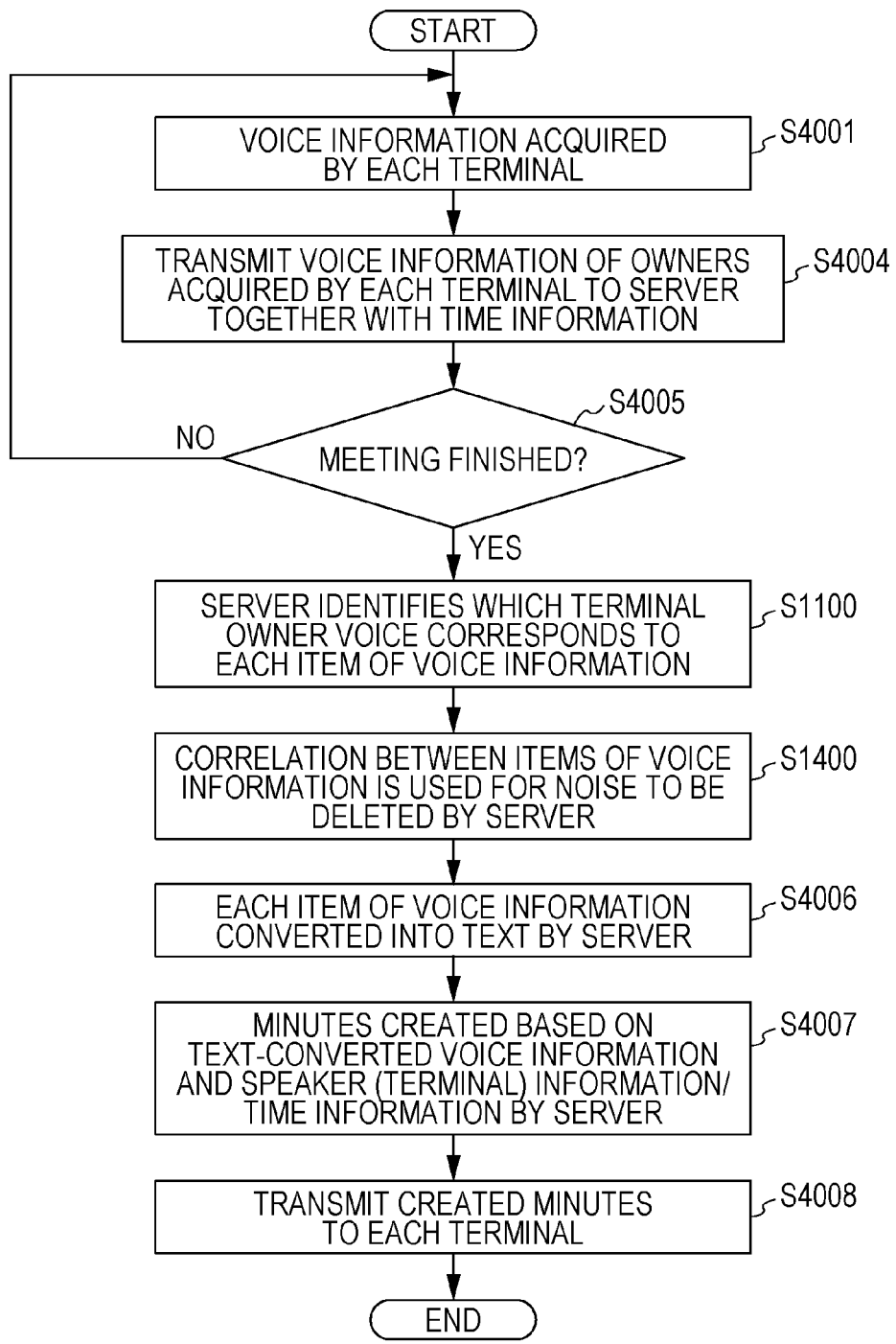
FIG. 14 is a flowchart depicting an example of the operation and processing of functional configurations of a text creation system in Modified Example 2 of Embodiment 1.
Figure 15:
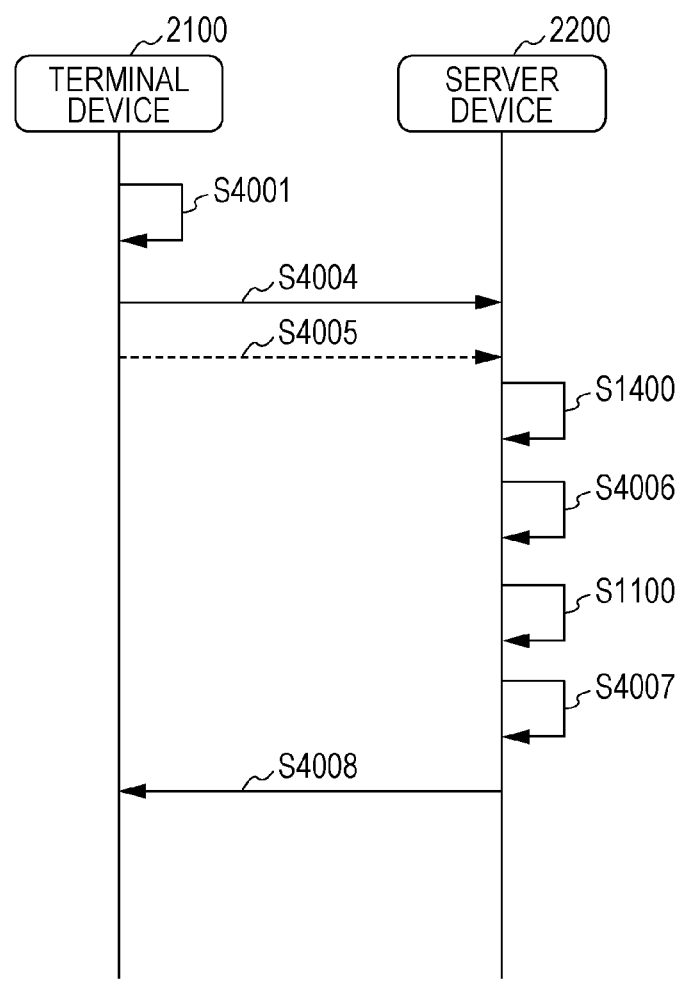
FIG. 15 is a sequence diagram depicting an example of the processing of a voice information control method in the text creation system in Modified Example 2 of Embodiment 1.

A voice information control method of Modified Example 2 in the present embodiment will be described hereinafter. In the present modified example, processing relating to noise removal in the server device 2200 is added to the system in Modified Example 1 of the present embodiment described in FIG. 12. A flowchart and a sequence diagram regarding this modified example are depicted in FIG. 14 and FIG. 15, respectively. A description is given hereinafter focusing on processing that is different from the flowchart of FIG. 4.

In the present modified example, the processing from steps S4001 to S4005 and steps S4006 to S4008 are the same as the processing in the flowchart depicted in FIG. 12. The difference with the processing depicted in FIG. 12 is that step S1400 has been added.

After identification has been carried out in step S1100 described in Modified Example 1 regarding the voice of the owner of a terminal device 2100 to which each item of voice information corresponds, processing proceeds to step S1400.

In step S1400, in the server device 2200, the correlation between each item of voice information is used to remove noise. The server device 2200 acquires all items of the voice information acquired by each terminal device 2100 (each terminal device 2100 transmits all items of the voice information acquired at all times during the meeting). Noise can therefore be removed by using the correlation between each item of voice information acquired.

For example, first, the control/processing unit 2202 of the server device 2200 distinguishes between speech intervals in which the owner of a terminal device 2100 has spoken and intervals in which that is not the case, with respect to voice information acquired from the terminal devices 2100 of each of the participants A to D. FIG. 16 depicts speech intervals (X) determined by the present system, and intervals (Y) other than the speech intervals. It is feasible for the determination of whether an interval is a speech interval or not to be carried out by determining a speech interval if the sound pressure level is equal to or greater than a threshold value, and determining a non-speech interval if the sound pressure level is lower than the threshold value, for example.

The control/processing unit 2202 of the server device 2200 then subtracts the values of intervals (Y) other than a speech interval (X) that are detected in the terminal devices 2100 (terminal B, C, or D, for example) other than a certain terminal device 2100 (terminal A, for example) at the same time as the speech interval (X), from the value of the speech interval (X) of the certain terminal device 2100.

In other words, in one aspect of the present voice recognition and text conversion, further comprising: specifying second voice information which is one of plurality items of first voice information, as the plurality items of the voice information received from a first terminal device from among the plurality of terminal devices, and which includes spoken voice of a first speaker who uses the first terminal device by comparing the plurality items of the first voice information and the plurality of items of the voice information received from a second terminal device from among a plurality of terminal devices; specifying one of the plurality items of the voice information, received from a second terminal device, which does not include spoken voice of a second speaker who uses the second terminal device as noise voice; and removing the specified noise voice from the voice information received from the first terminal device before voice recognition and text conversion are carried out using the second voice information.

FIG. 15 is a sequence diagram depicting an example of processing for the voice information control method of Modified Example 2 in the present embodiment. FIG. 15 depicts whether each step depicted in the flowchart of FIG. 14 is carried out by a terminal device 2100 or the server device 2200.

The sequence diagram depicted in FIG. 15 indicates that step S4001, step S4004, and step S4005 are processing that is carried out in the terminal device 2100.

Furthermore, it is indicated that step S1400, step S4006, step S1100, step S4007, and step S4008 are processing that is carried out in the server device 2200.

Furthermore, the same reference numbers as in FIG. 12 are indicated in the sequence diagram of FIG. 15 because the processing is the same as that depicted in FIG. 12, and a description is therefore omitted here. Furthermore, the same reference numbers as in FIG. 14 are indicated in the sequence diagram of FIG. 15 because the processing is the same as that depicted in FIG. 14, and a description is therefore omitted here.

As described above, the correlation between each item of voice information acquired from each terminal device 2100 is used in the present modified example to remove noise. Thus, erroneous recognition that occurs when performing voice recognition and text conversion processing can be reduced.

The present disclosure is useful for a voice information control method and a terminal device in a text creation system in which voice is acquired and text is created.

Furthermore, the voice information control method of the present disclosure is able to be applied in a teleconference system and teleconference device, a minutes creation system and minutes creation device, and a voice recognition application for a mobile terminal (smartphone or tablet).

What is claimed is:

1. A voice information control method for a terminal device for a user, the voice information control method comprising:

acquiring, by a terminal device, plural items of first voice information during a meeting;

specifying, by the terminal device, a time interval during which second voice information is included in the plural items of the first voice information, the second voice information corresponding to a spoken voice of a first speaker who uses the terminal device;

extracting, by the terminal device, the second voice information from the plural items of the first voice information, in accordance with the specified time interval;

accumulating, by the terminal device, the extracted second voice information into a memory of the terminal device; and transmitting, by the terminal device at an end of the meeting, the extracted second voice information, which has been accumulated in the memory, to a server device to cause the server device to create text data in accordance with the extracted second voice information, wherein a voice model for the first speaker associated with the terminal device is stored in advance in a memory of the terminal device, the first voice information includes second voice information, corresponding to the spoken voice of the first speaker associated with the terminal device based on the voice model, and other voice information, corresponding to spoken voices of one or more other speakers, and the transmitting includes transmitting only the extracted second voice information of the first speaker associated with the terminal device and specified time interval information associated with the extracted second voice information to the server device, wherein the other voice information corresponding to the spoken voices of the one or more other speakers is not transmitted to the server device.

2. The voice information control method according to claim 1,
wherein the terminal device retains a voice model including voice information relating to the first speaker, and
the specifying is performed by comparing the plural items of the first voice information and the voice model.

3. The voice information control method according to claim 1,
wherein the plural items of the first voice information included in a time interval other than the specified time interval is not transmitted to the server device in the transmitting.

4. The voice information control method according to claim 1,
wherein the end of the meeting is a timing at which the first speaker has instructed a system to terminate by way of the terminal device which the first speaker uses.

5. The voice information control method according to claim 1,
wherein at least one of the acquiring, the specifying, the accumulating, and the transmitting is carried out by a processor in the terminal device.

6. A voice information control method for a server device in a system, the voice information control method comprising:
receiving, by the server device from a first terminal device acquiring plural items of first voice information at an end of a meeting, (i) second voice information extracted from the plural items of the first voice information by the first terminal device, and (ii) a first time interval during which the second voice information is included in the plural items of the first voice information, the second voice information corresponding to spoken voice of a first speaker who uses the first terminal device during the meeting;
receiving, by the server device from a second terminal device acquiring plural items of third voice information at the end of the meeting, (i) fourth voice information extracted from the plural items of third voice information by the second terminal device, and (ii) a second time interval during which the fourth voice information is included in the plural items of third voice information, the fourth voice information corresponding to spoken voice of a second speaker who uses the second terminal device during the meeting;
converting, by the server device, the second voice information and fourth voice information into plural items of text data; and
integrating, by the server device, the plural items of the text data into one single text file in a time-sequential manner in accordance with the first time interval and the second time interval,
wherein a voice model for the first speaker associated with a terminal device is stored in advance in a memory of the terminal device,
the first voice information includes the second voice information, corresponding to the spoken voice of the first speaker associated with the terminal device based on the voice model, and other voice information, corresponding to spoken voices of one or more other speakers, and
the receiving includes receiving from the first terminal device only the extracted second voice information of the first speaker associated with the terminal device and specified time interval information associated with the extracted second voice information to the server device, wherein the other voice information corresponding to the spoken voices of the one or more other speakers is not transmitted to the server device.

7. The voice information control method according to claim 6, further comprising:
transmitting the integrated plural items of text data to at least one of the first terminal device and the second terminal device.

8. The voice information control method according to claim 7, further comprising:
creating minutes associated with the first and second terminal devices which have acquired the plural items of the other voice information, the first and second time intervals, and the converted plural items of text data; and
transmitting the created minutes to at least one of the first terminal device and the second terminal device.

9. The voice information control method according to claim 6,
wherein at least any one of the receiving, the converting, and the integrating is carried out using a processor.

10. A terminal device for a user, the terminal device comprising:
a memory;
a voice acquisitioner that acquires plural items first voice information;
a controller that specifies a time interval during which second voice information is included in the plural items of the first voice information, the second voice information corresponding to a spoken voice of a first speaker who uses the terminal device;
an extractor that extracts the second voice information from the plural items of the first voice information, in accordance with the specified time interval;
an accumulator that accumulates the extracted second voice information into the memory; and
a communicator that transmits the extracted second voice information, which has been accumulated in the memory, to a server device at an end of a meeting to cause the server device to create text data in accordance with the extracted second voice information,
wherein a voice model for the first speaker associated with the terminal device is stored in advance in the memory of the terminal device,
the first voice information includes second voice information, corresponding to the spoken voice of the first speaker associated with the terminal device based on the voice model, and other voice information, corresponding to spoken voices of one or more other speakers, and
the communicator transmits only the extracted second voice information of the first speaker associated with the terminal device and specified time interval information associated with the extracted second voice information to the server device, wherein the other voice information corresponding to the spoken voices of the one or more other speakers is not transmitted to the server device.

11. The terminal device according to claim 10,
wherein the terminal device comprises a recorder that retains a voice model that includes voice information relating to the first speaker, and
the controller specifies the time interval that includes the second voice information by comparing the plural items of the first voice information and the voice model.

12. The terminal device according to claim 10,
wherein, the controller does not transmit the plural items of the first voice information included in a time interval other than the specified time interval to the server device.

13. The terminal device according to claim 9,
wherein at least any one of the voice acquisitioner, the controller, the extractor, the accumulator, and the communicator includes a processor.

* * * * *